US007913074B2

(12) United States Patent
Litwack et al.

(10) Patent No.: US 7,913,074 B2
(45) Date of Patent: Mar. 22, 2011

(54) SECURELY LAUNCHING ENCRYPTED OPERATING SYSTEMS

(75) Inventors: Kevin M Litwack, Seattle, WA (US); Kenneth D. Ray, Seattle, WA (US); David R Wooten, Redmond, WA (US); Nathan T. Lewis, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 11/864,418

(22) Filed: Sep. 28, 2007

(65) Prior Publication Data

US 2009/0089568 A1 Apr. 2, 2009

(51) Int. Cl.
G06F 9/00 (2006.01)
H04L 29/06 (2006.01)
G06F 21/00 (2006.01)
G06F 11/30 (2006.01)
G06F 7/04 (2006.01)
H04K 1/00 (2006.01)
H04L 9/00 (2006.01)

(52) U.S. Cl. ............... 713/2; 713/1; 713/164; 713/182; 713/189; 726/2; 726/26; 380/255; 380/277

(58) Field of Classification Search .............. 713/1, 2, 713/164, 182, 189; 726/2, 26; 380/255, 380/277
See application file for complete search history.

(56) References Cited

U.S. PATENT DOCUMENTS

| 7,103,762 B2 | 9/2006 | Harper et al. | |
| 2005/0021944 A1* | 1/2005 | Craft et al. | 713/161 |
| 2005/0039006 A1* | 2/2005 | Stelling et al. | 713/170 |
| 2005/0091496 A1 | 4/2005 | Hyser | |
| 2005/0108564 A1 | 5/2005 | Freeman et al. | |
| 2005/0111664 A1* | 5/2005 | Ritz et al. | 380/255 |
| 2005/0246525 A1 | 11/2005 | Bade et al. | |
| 2005/0262571 A1 | 11/2005 | Zimmer et al. | |
| 2006/0010326 A1 | 1/2006 | Bade et al. | |
| 2006/0015717 A1 | 1/2006 | Liu et al. | |
| 2006/0155988 A1 | 7/2006 | Hunter et al. | |
| 2006/0212939 A1 | 9/2006 | England et al. | |
| 2007/0050643 A1* | 3/2007 | Negishi | 713/193 |
| 2009/0288161 A1* | 11/2009 | Wei et al. | 726/22 |

OTHER PUBLICATIONS

"Intel Trusted Execution Technology", available at least as early as Jun. 8, 2007, at <<http://download.intel.com/technology/security/downloads/31516803.pdf>>, Intel Corporation, 2006, pp. 140.

(Continued)

Primary Examiner — Stefan Stoynov
(74) Attorney, Agent, or Firm — Lee & Hayes, PLLC (57) ABSTRACT

Tools and techniques for securely launching encrypted operating systems are described herein. The tools may provide computing systems that include operating systems (OSs) that define boot paths for the systems. This boot path may include first and second OS loader components. The first loader may include instructions for retrieving a list of disk sectors from a first store, and for retrieving these specified sectors from an encrypted second store. The first loader may also store the sectors in a third store that is accessible to both the first and the second loader components, and may invoke the second loader to try launching the OS using these sectors. In turn, the second loader may include instructions for retrieving these sectors from the third store, and for unsealing a key for decrypting these sectors. The second loader may then decrypt these sectors, and attempt to launch the OS from these sectors.

35 Claims, 5 Drawing Sheets

OTHER PUBLICATIONS

Kuhlmann, et al., "D02.2 Requirements Definition and Specification", available at least as early as Jun. 8, 2007, at <<http://www.opentc.net/deliverables2006/OTC_D02.2_Requirements_Definition_and_Specification_update.pdf>>, pp. 141.

"Secure Startup-Full Volume Encryption: Technical Overview", available at least as early as Jun. 8, 2007, at <<http://download.microsoft.com/download/5/D/6/5D6EAF2B-7DDF-476B-93DC-7CF0072878E6/secure-start_tech.doc>>, WinHEC, 2005, pp. 20.

"Trusted Computing IY5608: The Roots of Trust—The RTM and the TPM", available at least as early as Jun. 8, 2007, at <<http://www.isg.rhul.ac.uk/files/IY5608_-_Lecture_2_Roots_of_Trust.pdf>>, 2007, pp. 63.

* cited by examiner

FIG. 5

SECURELY LAUNCHING ENCRYPTED OPERATING SYSTEMS

BACKGROUND

For a variety of security-related reasons, computer systems may encrypt their entire disk drives or other mass storage volumes. Thus, in such an environment, all disk sectors that contain operating system (OS) files are typically encrypted. When booting an encrypted operating system, decryption keys are provided only to trusted components; otherwise, the purpose behind encrypting the whole volume may be defeated. To access the decryption keys using conventional techniques, all sectors for booting the OS may be loaded. However, to know which sectors to load, the decryption keys may be provided to a boot process, thereby resulting in an apparent "chicken-and-egg" problem.

SUMMARY

Tools and techniques for securely launching encrypted operating systems are described herein. The tools may provide computing systems that include operating systems (OSs) that define boot paths for the systems. This boot path may include first and second OS loader components. The first loader may include instructions for retrieving a list of disk sectors from a first store, and for retrieving these specified sectors from an encrypted second store. The first loader may also store the sectors in a third store that is accessible to both the first and the second loader components, and may invoke the second loader to try launching the OS using these sectors. In turn, the second loader may include instructions for retrieving these sectors from the third store, and for unsealing a key for decrypting these sectors. The second loader may then decrypt these sectors, and attempt to launch the OS from these sectors.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to dynamically validating editors are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide for securely launching encrypted operating systems. This discussion also describes other techniques and/or processes that the tools may perform.

Figure 1:
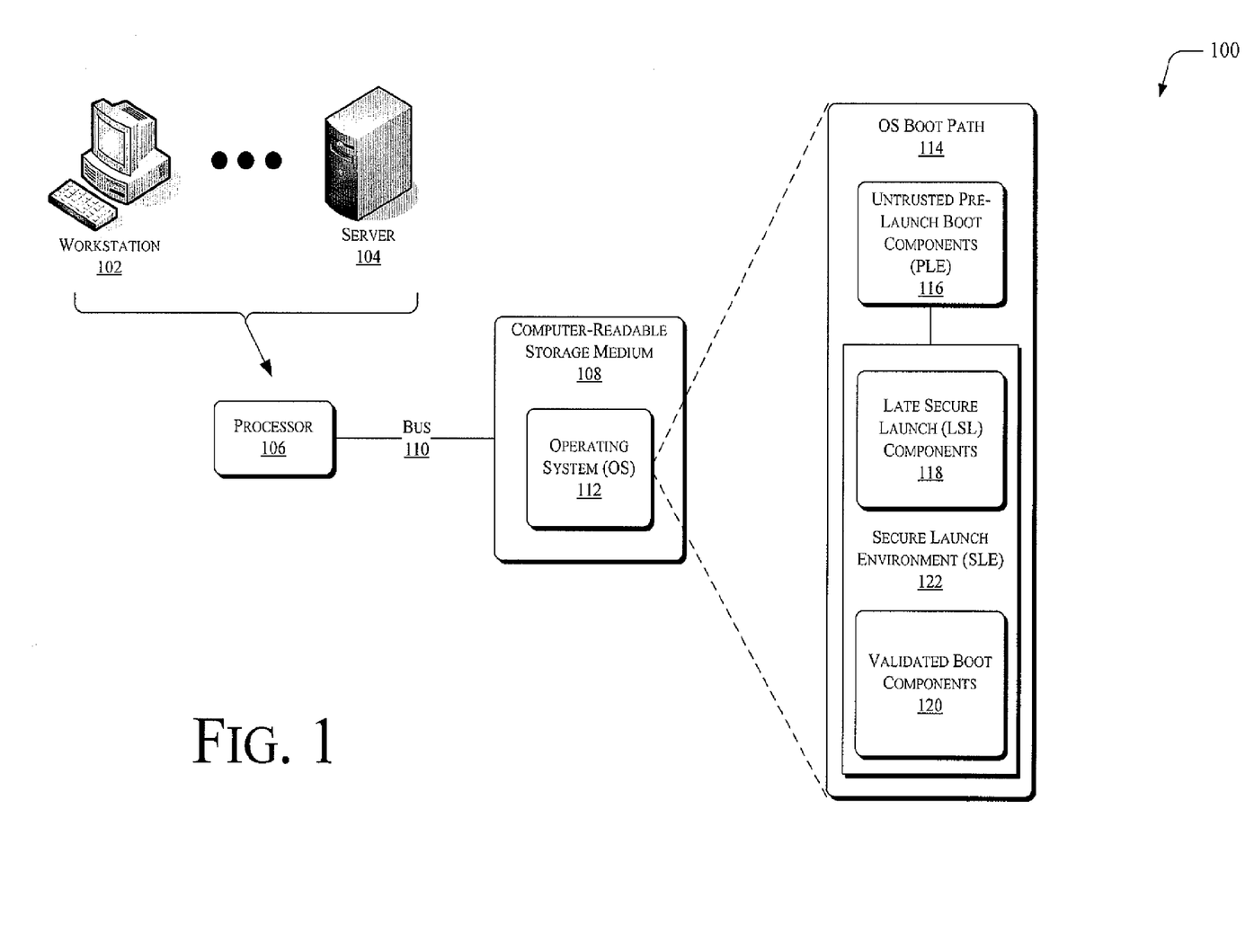
FIG. 1 is a block diagram illustrating systems and/or operating environments securely launching encrypted operating systems.

FIG. 1 illustrates systems and/or operating environments 100 securely launching encrypted operating systems. The systems 100 may include one or more devices such as personal computing workstations 102 and/or servers 104. The workstations and/or servers may be computer-based systems that include one or more processors, denoted at 106. These processors may also be categorized or characterized as having a given type or architecture, but may or may not have the same type or architecture.

The workstations and/or servers may also include one or more instances of machine-readable or computer-readable storage media, denoted generally at 108. As detailed further below, the computer-readable storage media may include memory components, hard disk drives, and/or RAM disks.

The processor may communicate with the computer-readable media 108, and other components or sub-systems of the workstations and/or servers, via one or more busses 110. These busses 110 may be of any suitable width, and may comply with any convenient bus architecture.

The computer-readable media 108 may contain instructions that, when executed by the processor, perform any of the tools or related functions that are described herein as being performed by the workstations and/or servers. The processor may access and/or execute the instructions embedded or encoded onto the computer-readable media, and/or may access data stored in the computer-readable media. Additionally, it is noted that the computer-readable storage media, and any software stored thereon, may reside on hardware other than that shown in FIG. 1 without departing from the scope and spirit of the description herein. The examples shown in FIG. 1 are provided only to facilitate discussion, but not to limit possible implementations.

Turning in more detail to the computer-readable media 108, it may include one or more instances of an operating system (OS) 112. The various files constituting the OS may be encrypted when stored in the computer-readable media 108, for security or other reasons. In some instances, the entire workstation and/or server may be encrypted, such that all data stored on these machines (including the OS files) is encrypted.

When the workstation and/or server is reset, booted, or rebooted, the OS may define and process a boot path as part of the process of loading the OS for execution. FIG. 1 denotes this boot path generally at 114. The components residing in the boot path, and the characteristics of these components, are described further below in FIGS. 2-4. However, in overview, the boot path may include one or more boot components 116 that are "untrusted", in the sense that third-party vendors may have provided these components, and may be subject to malicious attack. The boot path may include one or more late secure launch components 118 that contain software instructions for securely launching the encrypted operating systems, according to the tools and techniques described herein. The boot path may also include one or more boot components 120, which may form the decrypted and/or validated output of the secure launch components 118.

For the purposes of continuing this description, the following terms are used with these illustrative meanings. These meanings are provided only to facilitate this description, but do not limit the scope of possible implementations of the tools and techniques described herein.

Secure Launch Environment (SLE) 122—An environment from which an encrypted operating system (e.g., 112) is launched. As shown in FIG. 1, the SLE 122 may include the secure launch components 118 and the validated boot components 120. To promote overall system security, the SLE is protected from interference by any previous and/or concurrent execution environments outside of its control. Additionally, components within the SLE may be measured in order to tie secrets, such as decryption keys, to the identities of the components. In turn, these measurement(s) are similarly protected by, for example, encryption.

Late Secure Launch (LSL) components 118—A secure OS launch in which the SLE does not include the entire boot process (e.g., the boot path 114), but rather is constructed dynamically at some point after one or more initial boot processes complete (e.g., the untrusted boot components 116). For example, an LSL might be implemented via a chipset function that puts a computing platform (e.g., the processor 106) into a well-defined or expected state after completing at least some of the OS boot path, and then measures the SLE.

Pre-Launch Environment (PLE) 116—If an LSL is used, everything prior to the SLE (e.g., 122) is considered the PLE. If there is no LSL, then there is no PLE; the entire boot process would become the SLE.

Figure 2:
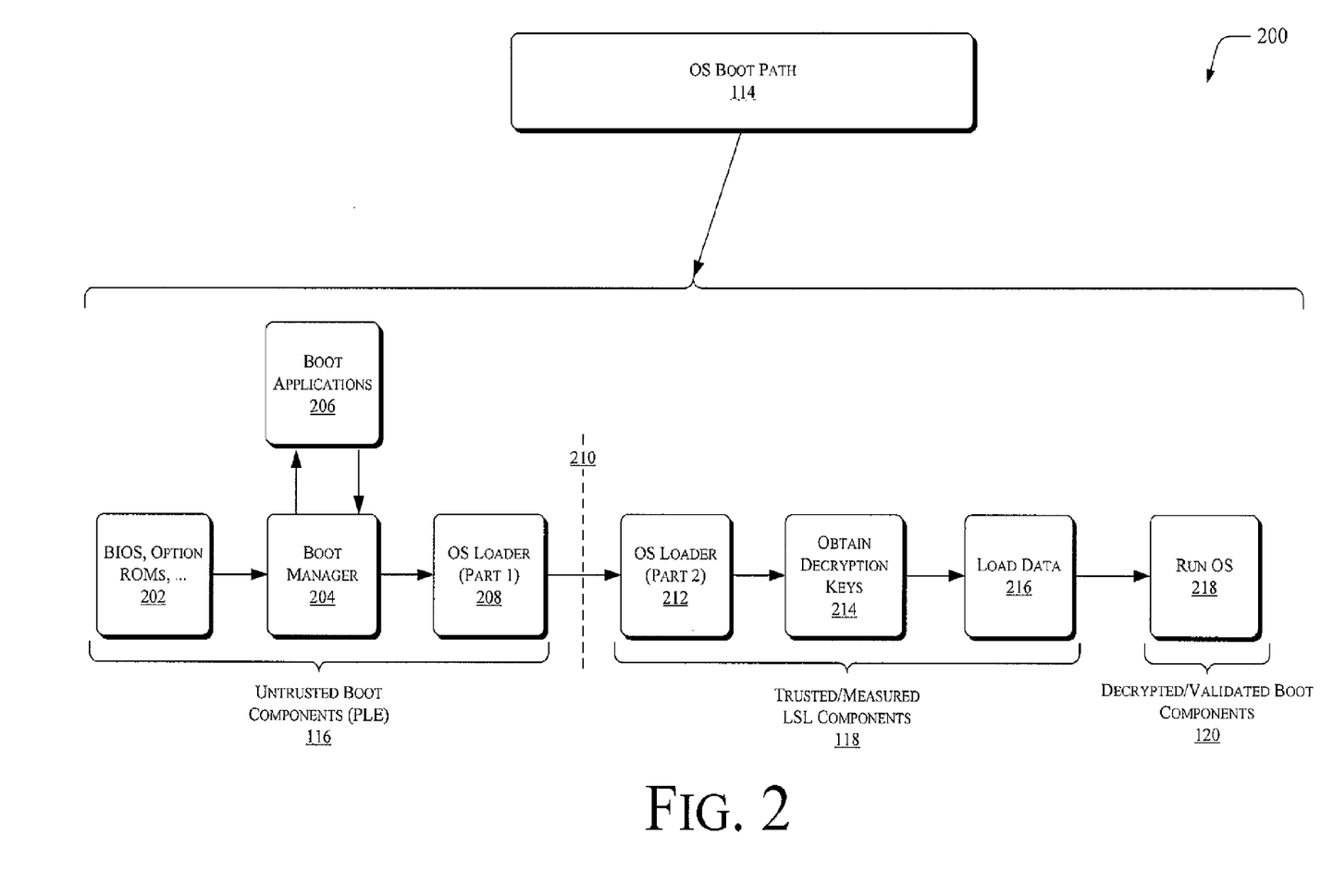
FIG. 2 is a block diagram illustrating various components in an example operating system boot path, provided as part of the tools for securely launching encrypted operating systems.

Having described the systems and/or operating environments 100 for securely launching the encrypted operating systems in FIG. 1, the discussion now turns to a more detailed description of various components in an example operating system boot path, provided as part of the tools for securely launching encrypted operating systems, now presented with FIG. 2.

FIG. 2 is a block diagram illustrating various components 200 in an example operating system boot path, provided as part of the tools for securely launching encrypted operating systems. For convenience of description, but not to limit possible implementations, FIG. 2 may carry forward some items described previously, and may denote them by similar reference signs.

As shown in FIG. 2, an example OS boot path (e.g., 114) as a whole may include PLE components 116, LSL components 118, and validated components 120. Turning to the PLE components 116, these components may include software contributed to the boot path by a BIOS 202, one or more option ROMs, and the like. The BIOS/option ROM may load software or drivers associated with various cards and adapters plugged into a given system. A boot manager 204 may select an operating system to run, for example, in instances when a given workstation or server is capable of booting and running a variety of different operating systems. Boot applications, as shown in FIG. 2 at 206, may be self-contained programs that perform various task(s) to aid in choosing or preparing an OS to boot. in the Windows® family of operating systems, an example of the applications 206 is the memtest.exe utility, which tests system memory for bad sectors, so that the OS can work around them. However, in other types of families of operating systems, the boot applications 206 may take different, but still suitable, forms. More generally, it is noted that the exact components 204-206 may vary across different systems, depending what cards and adapters are plugged into the system. The PLE components may also include a first portion of an OS loader, denoted at 208.

For example only, but not for limitation, FIG. 2 separates the PLE components 116 and the LSL components 118 by the dashed line 210. The PLE components 116 may be "untrusted", in the sense that they may be software components that are provided by third-party vendors, rather than the vendor who provides the LSL components. Thus, the boot path shown in FIG. 2 separates or isolates these PLE components 116 from the measured LSL components 118 and the validated components 120. More specifically, the LSL components 118 are measured and validated separately from the PLE components 116. One example of such measurements is to compute a respective measure for the various LSL components 118 at some initial point in time. This measure may include a cryptographic hash, a checksum, or other suitable mechanism that generates unique signatures for the LSL components. During later instantiations of the boot path 114, these checksums may be recomputed and compared to the original checksum. Any discrepancies between these measurements may indicate some level of tampering with the LSL components 118.

In some instances, one or more of the PLE components 116 may be attacked and replaced with malicious code. Such malicious code may, for example, specify an invalid list of sectors for booting the OS. However, when the LSL components 118 attempt to decrypt these sectors and launch the OS from these sectors, the LSL components 118 would receive unexpected results back, and would not recognize these unexpected results as a valid file system. The LSL components 118 would then terminate the boot process, thereby minimizing the impact of the attack on the PLE components 116.

Turning to the LSL components 118 in more detail, FIG. 2 denotes a second portion of the OS loader at 212. As detailed further in FIGS. 3 and 4, the two portions of the OS loader 208 and 212 cooperate with one another to securely launch the encrypted OS. In turn, portions of the LSL obtain or unseal decryption keys for portions of the encrypted OS, as denoted at 214. In addition to the decryption keys, the LSL components 118 may maintain a key for measuring the integrity of the various components 118. Afterwards, the LSL may decrypt and load these portions of the OS, as denoted at 216.

Turning now to the validated boot components 120, block 218 represents successfully launching and running the fully-booted and decrypted OS. However, as described now in FIG. 3, the tools for securely launching the encrypted operating systems may repeat certain processing to boot the OS completely.

Figure 3:
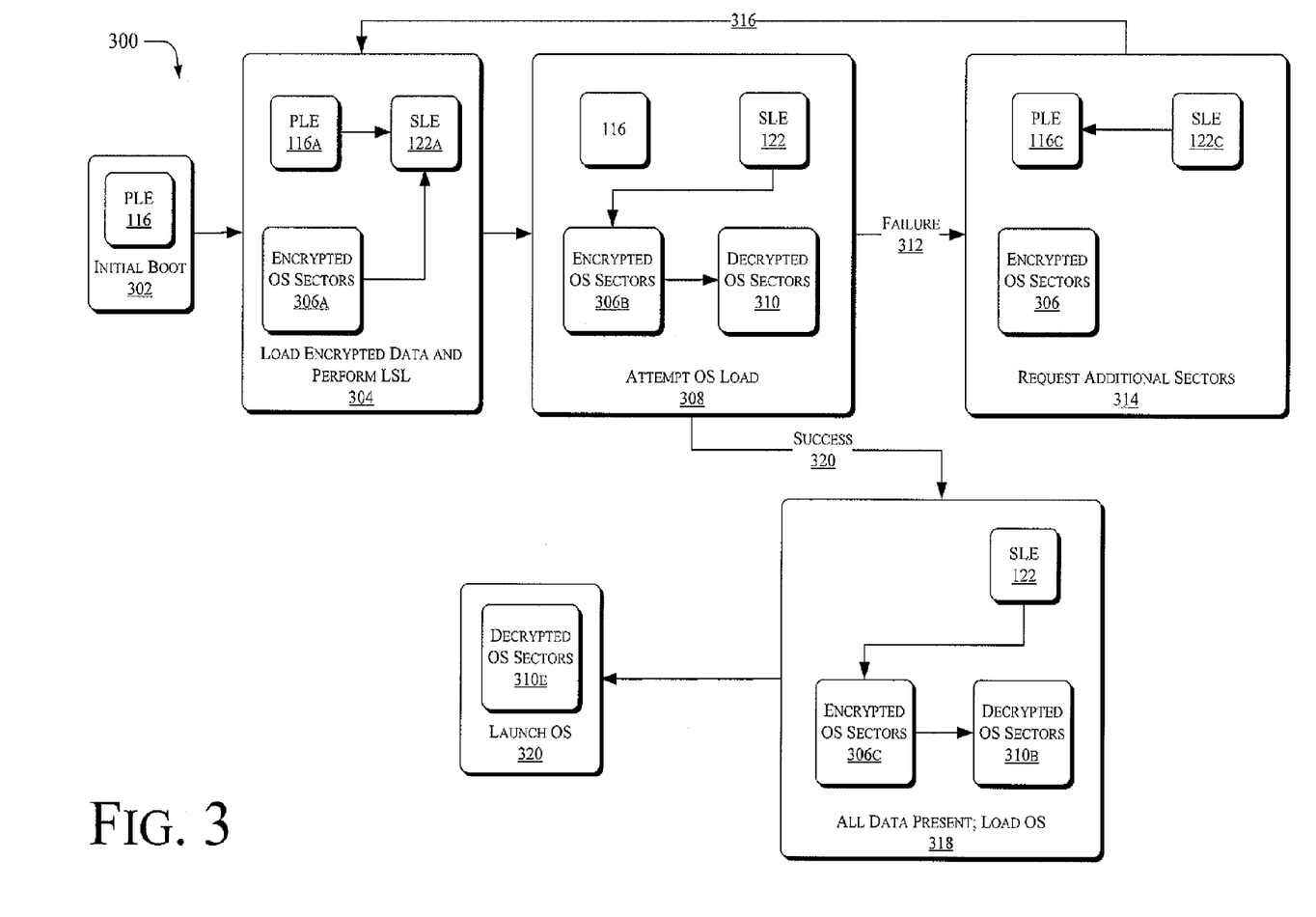
FIG. 3 is a state diagram illustrating a sequence of states through which the operating systems may pass as the boot path is processed.

FIG. 3 illustrates a sequence of states, denoted generally at 300, through which the OS may pass as it processes the boot path. For convenience of description, but not to limit possible implementations, FIG. 3 may carry forward some items described previously, and may denote them by similar reference signs.

An initial state 302 includes performing an initial boot that loads the PLE (e.g., 116). Afterwards, a state 304 includes loading one or more encrypted OS sectors 306a, and performing the LSL. As indicated in FIG. 3, the state 304 may include providing at least some of the OS sectors 306a to an SLE (e.g., 122a), as represented by the arrow from block 306a to block 122a.

A state 308 includes attempting to load the OS, using the OS sectors provided to the SLE in state 304. More specifically, the state 308 may include decrypting the OS sectors to obtain the OS sectors 310, as represented by the arrow from block 306b to block 310.

The outcome of the state 308 may be either a failure or a success, depending on whether the PLE provided the SLE with access to all sectors for booting the OS. FIG. 3 denotes a failure condition at the arrow 312, indicating a transition to state 314. This state 314 represents the SLE requesting additional sectors for booting the OS. More specifically, FIG. 3 represents this request for the additional sectors by the arrow from block 122c to block 116c. Afterwards, the state 314 returns to state 304, as indicated by the arrow 316. This transition 316 may represent a fail-back transition, by which the SLE requests the PLE to provide additional sectors of the encrypted OS. Afterwards, the SLE may repeat the attempt to load the OS, transitioning to the state 308. If this second attempt fails again, the states 314, 304, and 308 are repeated to enable the SLE to obtain any additional sectors.

From the state 308, if the SLE is able to load the entire OS successfully using the sectors provided by the PLE, then the state 308 transitions to state 318. FIG. 3 denotes a success condition at the arrow 320. In state 318, the PLE has performed its functions of providing OS sectors to the SLE; therefore, the block representation of the state 318 omits the PLE. In turn, state 318 may transition to state 320, to launch the fully-loaded OS by executing software instructions contained in the decrypted OS sectors, denoted at 310e.

Figure 4:
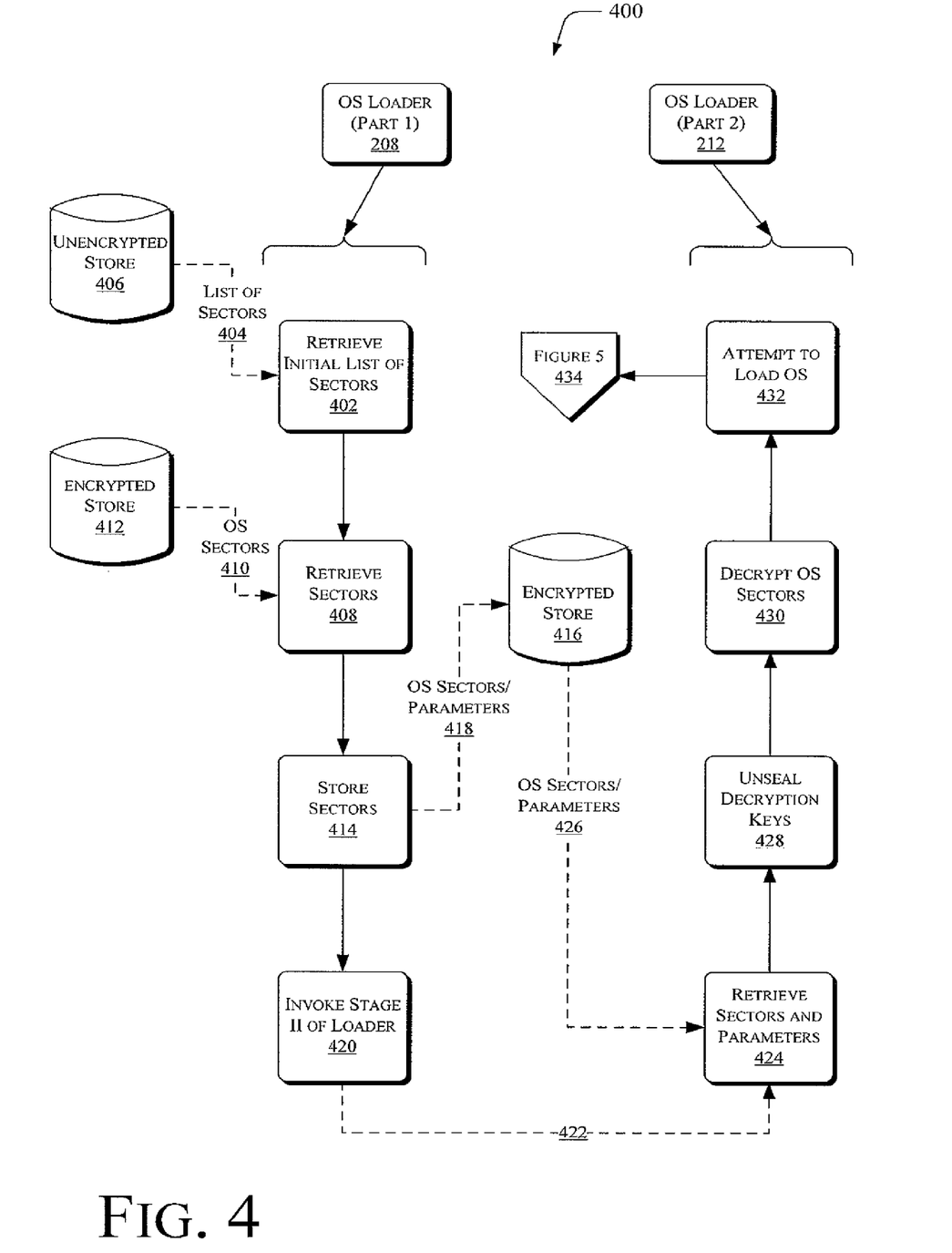
FIG. 4 is a flow diagram of processes for securely launching encrypted operating systems.
Figure 5:
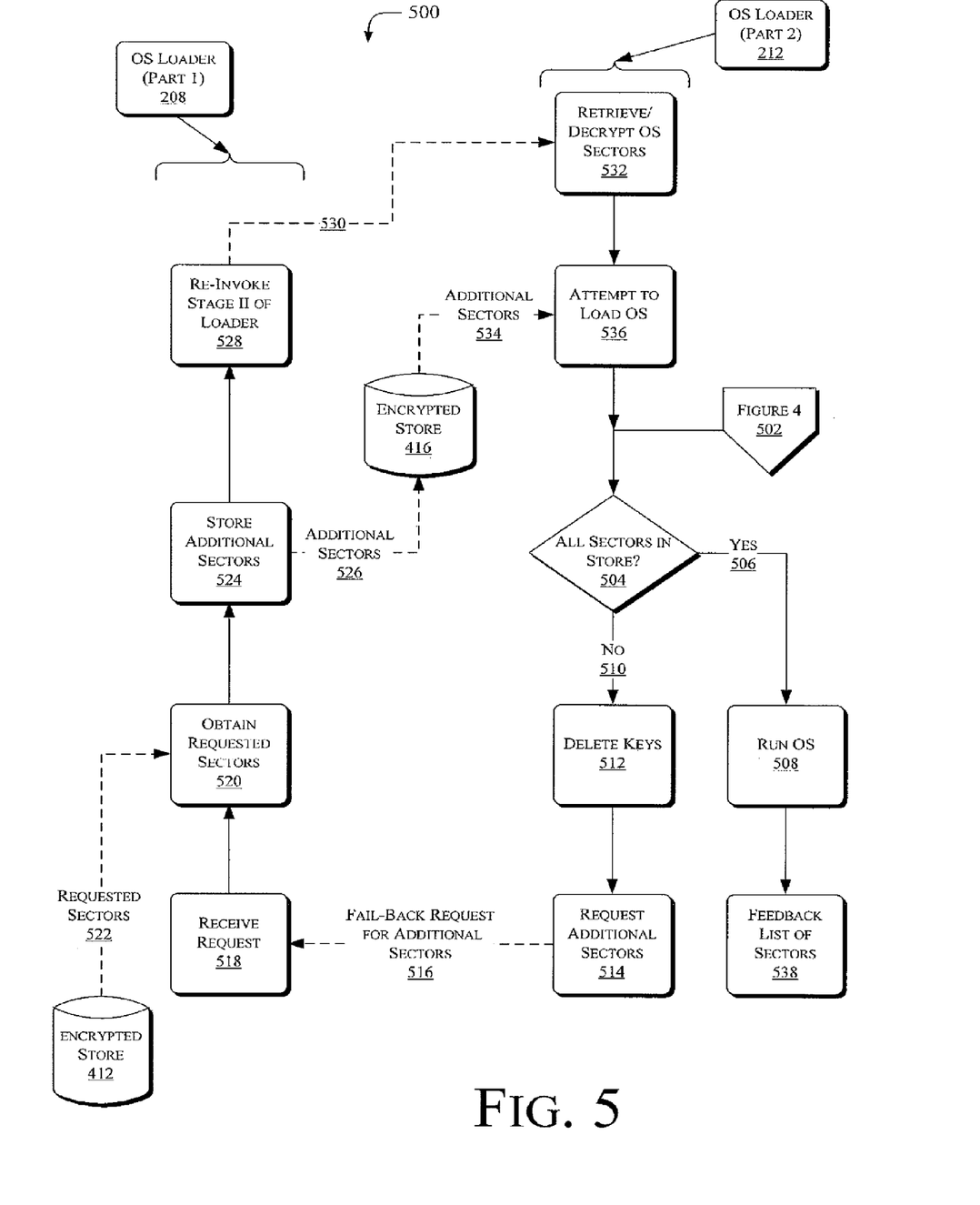
FIG. 5 is a flow diagram continuing the processes shown in FIG. 4 for securely launching the encrypted operating systems.

Having described the states in FIG. 3 related to securely launching the encrypted operating systems, the discussion now turns to descriptions of processes for securely launching the encrypted operating systems, now presented with FIGS. 4 and 5.

FIGS. 4 and 5 illustrate processes, generally denoted at 400 and 500, for securely launching encrypted operating systems. For convenience of description, but not to limit possible implementations, FIGS. 4 and 5 may carry forward some items described previously, and may denote them by similar reference signs. Additionally, for ease of description, but not to limit possible implementations, certain processing blocks are arranged in columns as shown in FIGS. 4 and 5 to correspond to example components that are described above.

Turning to the processes 400 in more detail, block 402 represents retrieving an initial list 404 of OS sectors. This initial list may be a preliminary "best guess" on which sectors of file system would be appropriate for booting the OS. In the example shown, a first OS loader component (e.g., 208) may perform block 402, and block 402 may include obtaining these sectors from an unencrypted store 406. An example of the unencrypted store may be a configuration data file stored on a hard disk.

Block 408 represents retrieving data from the sectors indicated in the list of sectors 404. The data retrieved in block 408 may, at least in part, include OS files, as denoted at 410. Block 408 may include retrieving encrypted OS files from an encrypted store 412. Although the store 412 is described as "encrypted", in some cases, some sectors (or parts thereof), in the store may be unencrypted. For example, the encrypted store 412 may represent a hard disk drive protected under a full volume encryption policy. Typically, the encrypted store 412 may be accessible only to the first OS loader component 208, for a variety of possible reasons. For example, these restrictions may arise due to technical design limitations or constraints, or due to security policies.

Block 414 represents storing the retrieved, encrypted OS sectors in another encrypted store 416. The store 416 may take the form of memory that is accessible to the second OS loader component 212, and is thus shared between the loader components 208 and 212. In example implementations, this memory store may be configured as a sparse RAM disk. Block 414 may also include storing the OS sectors along with any parameters relevant to launching the OS. FIG. 4 denotes these OS sectors and related parameters at 418. Such parameters may include, for example only, information for accessing and/or using hardware (e.g., the outputs of a tool such as memtest.exe, as described above). Another example may be credential information collected by the PLE from, for example, a smart card or USB device. The SLE may use such credentials to access decryption key.

Block 420 represents invoking any platform operation(s) for initiating the late secure launch (LSL) within the secure launch environment (SLE). Block 420 may include invoking the second portion of the OS loader component 212, as denoted by the dashed line 422 in FIG. 4, once the OS sectors and any relevant boot parameters are stored.

Turning to the OS loader component 212, block 424 represents retrieving the OS sectors and any parameters from the encrypted store 416. FIG. 4 denotes at 426 the OS sectors and any parameters as retrieved from the store 416. Block 424 may include the OS loader component 212 beginning its execution by validating any input parameters pulled from the store.

Block 428 represents unsealing or otherwise obtaining or retrieving any decryption keys used to decrypt the encrypted OS sectors 426. These decryption keys may be tied or cryptographically bound to the identity of the OS loader component 212, such that only the OS loader component 212 may unseal the key to decrypt the OS sector files 426.

Block 430 represents decrypting the OS sectors 426. Block 430 may include using the decryption key unsealed in block 428.

Block 432 represents attempting to load the operating system, using the OS sectors 426. Block 432 may include the OS loader component 212 reading any number of files to attempt to launch the OS. However, in the examples described herein, the OS loader component 212 does not directly access the main encrypted store 406 (e.g., a physical, encrypted hard disk), but instead uses the cached sectors passed by the OS loader component 208 via the shared memory 416.

For clarity of illustration, but not to limit possible implementations, the description of the process flows 400 and 500 now continues to FIG. 5, with FIGS. 4 and 5 being linked by the off-page reference symbol 434. The discussion of FIG. 5 begins at the off-page reference symbol 502.

Block 504 represents determining whether all sectors for launching the OS are present in the sectors 418 that were placed in the store 416 (e.g., a RAM disk) and passed to the OS loader component 212 as sectors 426. Put differently, block 504 may include determining whether the SLE may successfully boot and launch the OS using only the OS sectors 426. If so, the process flows 500 may proceed via Yes branch 506 to block 508 to launch and run the OS.

Returning to block 504, if the OS may not launch using only the sectors currently in the store 416, then the process flows 500 may take No branch 510 to block 512. Block 512 represents deleting decryption keys, decrypted sectors, and any other sensitive or secret information to reduce the risk of compromise.

Block 514 represents requesting that additional OS sectors be loaded, for example, into the encrypted store 416. Typically, after the OS loader component 212 processes the OS sectors originally provided in the encrypted store 416, the OS loader component 212 may determine which additional sectors, if any, are missing. Thus, in at least some cases, the OS loader component 212 may request that the OS loader component 208 provide particular OS sectors in one or more fail-back requests for additional sectors. FIG. 5 denotes examples of such requests at 516.

At the OS loader component 208, block 518 represents receiving the request for additional OS sectors (e.g., 518). As noted above, this request may reference particular sectors that were missing from the group of OS sectors previously loaded into the store 416.

Block 520 represents obtaining additional OS sectors from an encrypted store. Block 520 may include obtaining the additional OS sectors from the encrypted store 412, with these additional sectors denoted at 522. In some cases, the request 516 may specify particular sectors to be fetched.

Block 524 represents storing the additional sectors in, for example, the encrypted store 416. Recalling that the OS loader components 212 and 208 may both access the store 416, block 524 may include making the additional sectors available to the OS loader component 212. FIG. 5 denotes these additional sectors as loaded into the store at 526.

Block 528 represents invoking (or re-invoking) the second portion of the OS loader component 212. FIG. 5 denotes this invocation at 530. Block 528 may include, for example, generating appropriate interrupts, as well as method, procedure, or function calls.

Returning to the OS loader component 212, block 532 represents retrieving the additional OS sectors, as denoted at 534. Block 532 also represents decrypting the additional OS sectors 534, and may include unsealing any decryption keys appropriate for decrypting these additional OS sectors. As noted above, block 512 may have deleted the previous decryption keys in the interests of security.

Block 536 represents attempting to load the OS from the additional sectors (e.g., 534) provided by the OS loader component 208. In some sense, block 536 may be similar to block 432 in FIG. 4. However, block 432 represents attempting to load the OS with an initial group of sectors placed into the store 416 by the OS loader component 208, while block 536 represents one or more additional attempts to load the OS with additional sectors provided sometime after this initial group of sectors.

From block 536, the process flows 500 may proceed to decision block 504 to determine whether all sectors for booting the OS are now in the store. Block 504 was detailed above, and the process flows 500 may proceed from block 504 as described previously.

As an operational example, assume that the OS loader component 208 initially provides sectors 0-10 to the store 416, but assume also that the OS loader component 212 should have access to sectors 0-30 in order to successfully launch the OS. On its first attempt, the OS loader component 212 may access and load the provided sectors 0-10. In this example, the OS loader component 212 would then discover that sectors 11-20 are currently missing. In other examples, the OS loader component 212 may or may not yet realize that sectors 21-30 are also missing.

In any case, realizing that at least some sectors are missing, the OS loader component 212 would disposes of all its secrets and keys (e.g., block 512), and may then return a data structure back to the OS loader component 208 indicating that it believes it can succeed if given the additional sectors 11-20. FIG. 5 provides an example of this data structure at the fail-back request 516. The OS loader component 208 may then process this request, obtain the additional encrypted sectors from disk (e.g., the store 412), and load these sectors into a RAM disk (e.g., the store 416). The OS loader component 208 may then retry the LSL and invoke the second stage of the loader (e.g., block 528) for a second attempt at loading the OS.

On this second attempt, the OS loader component 212 will typically proceed further, but in this example, assume that it again stops loading when it discovers that sectors 21-30 are missing. The OS loader component 212 may again request more sectors, with the OS loader component 208 again obtaining additional sectors and loading them into the RAM disk. On the third try, the OS loader component 212 would find all the sectors for launching the OS, and proceed to launching and running the OS (e.g., block 508).

Block 538 represents feeding back and/or storing a complete list of disk sectors for booting the OS. In the example shown in FIG. 5, the OS loader component 208 may feedback this list of sectors for storage. In some cases, block 538 may include using the fail-back requests 516 to update this list of sectors. In other instances, block 538 may include updating this list of disk sectors when the OS shuts down, hibernates, or assumes any other convenient state.

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. At least one machine-readable storage medium comprising machine-readable instructions that, when executed by the machine, cause the machine to perform a method comprising:
   retrieving a list that provides at least one sector from an unencrypted store;
   retrieving the at least one sector from an encrypted store;
   unsealing at least one key for decrypting the at least one sector;
   decrypting the at least the sector; and
   at least attempting to launch an operating system from the at least one the decrypted sector.

2. The machine-readable storage medium of claim 1, further comprising instructions for determining whether the operating system may be launched from the at least the decrypted sector.

3. The machine-readable storage medium of claim 1, further comprising instructions for requesting that at least one additional sector be loaded into the encrypted store.

4. The machine-readable storage medium of claim 1, further comprising instructions for identifying at least one missing sector for launching the operating system, and further comprising instructions for requesting the at least one missing sector.

5. The machine-readable storage medium of claim 4, further comprising instructions for retrieving the at least the missing sector from the encrypted store, and for attempting to launch the operating system from the at least one decrypted sector and the at least one missing sector.

6. The machine-readable storage medium of claim 5, further comprising instructions for determining whether the operating system may be launched from the at least one decrypted sector and the at least one missing sector.

7. The machine-readable storage medium of claim 1, further comprising instructions for launching the operating system at least from the at least one decrypted sector.

8. The machine-readable storage medium of claim 1, further comprising instructions for deleting the key in response to determining that the operating system may not be launched from at least the at least one decrypted sector.

9. The machine-readable storage medium of claim 1, further comprising instructions for providing feedback including at least a list of sectors for launching the operating system.

10. An operating system launched by executing at least the instructions of claim 1.

11. At least one machine-readable storage medium comprising machine-readable instructions that, when executed by the machine, cause the machine to perform a method comprising:
retrieving a list that includes at least one sector from a first store, wherein the first store is unencrypted;
retrieving the at least one sector specified in the list from a second store, wherein the second store is encrypted;
storing the at least one sector in a third store; and
invoking a loader component at least to attempt to launch an operating system from the at least one sector.

12. The machine-readable storage medium of claim 11, further comprising instructions for receiving at least one fail-back request from the loader component, in response to the loader component determining that the at least one sector is missing for launching the operating system.

13. The machine-readable storage medium of claim 12, further comprising instructions for retrieving at least one additional sector from the second store in response to the at least one fail-back request.

14. The machine-readable storage medium of claim 12, further comprising instructions for loading at least one additional sector into the third store in response to the at least one fail-back request.

15. The machine-readable storage medium of claim 12, further comprising instructions for re-invoking the loader component to attempt to launch the operating system from the at least one sector and the at least one additional sector in response to the at least one fail-back request.

16. An operating system launched by executing at least the instructions of claim 11.

17. The machine-readable storage medium of claim 11, further comprising instructions for providing feedback including at least a list of sectors for launching the operating system.

18. A processor-based computing system comprising at least:
an operating system associated with a boot path that includes a first operating system loader component and at least a second operating system loader component;
wherein the first loader component includes executable instructions for:
retrieving a list that includes at least one sector from a first store;
retrieving at least one sector specified in the list from a second store, wherein the second store is encrypted;
storing at least the sector in a third store; and
invoking the second loader component at least to attempt to launch the operating system from at least the sector; and
wherein the second loader component includes executable instructions for:
retrieving at least the sector from the third store;
unsealing at least one key for decrypting the sector;
decrypting at least the sector; and
at least attempting to launch an operating system from at least the decrypted sector.

19. A late secure launch (LSL) environment for operating within the system of claim 18.

20. The system of claim 18, wherein the first loader component is included within a pre-launch environment (PLE), and wherein the second loader component is included within a secure launch environment (SLE).

21. A computerized method comprising:
retrieving a list that provides at least one sector from an unencrypted store;
retrieving the at least one sector from an encrypted store;
unsealing at least one key for decrypting the at least one sector;
decrypting the at least the sector; and
at least attempting to launch an operating system from the at least one the decrypted sector.

22. The computerized method of claim 21, further comprising determining whether the operating system may be launched from the at least the decrypted sector.

23. The computerized method of claim 21, further comprising requesting that at least one additional sector be loaded into the encrypted store.

24. The computerized method of claim 21, further comprising identifying at least one missing sector for launching the operating system, and further comprising instructions for requesting the at least one missing sector.

25. The computerized method of claim 24, further comprising retrieving the at least the missing sector from the encrypted store, and for attempting to launch the operating system from the at least one decrypted sector and the at least one missing sector.

26. The computerized method of claim 25, further comprising determining whether the operating system may be launched from the at least one decrypted sector and the at least one missing sector.

27. The computerized method of claim 21, further comprising launching the operating system at least from the at least one decrypted sector.

28. The computerized method of claim 21, further comprising deleting the key in response to determining that the operating system may not be launched from at least the at least one decrypted sector.

29. The computerized method of claim 21, further comprising providing feedback including at least a list of sectors for launching the operating system.

30. A computerized method comprising:
retrieving a list that includes at least one sector from a first store, wherein the first store is unencrypted;
retrieving the at least one sector specified in the list from a second store, wherein the second store is encrypted;
storing the at least one sector in a third store; and
invoking a loader component at least to attempt to launch an operating system from the at least one sector.

31. The computerized method of claim 30, further comprising receiving at least one fail-back request from the loader component, in response to the loader component determining that the at least one sector is missing for launching the operating system.

32. The computerized method of claim 31, further comprising retrieving at least one additional sector from the second store in response to the at least one fail-back request.

33. The computerized method of claim 31, further comprising instructions for loading at least one additional sector into the third store in response to the at least one fail-back request.

34. The computerized method of claim 31, further comprising re- invoking the loader component to attempt to launch the operating system from the at least one sector and the at least one additional sector in response to the at least one fail- back request.

35. The computerized method of claim 30, further comprising providing feedback including at least a list of sectors for launching the operating system.

* * * * *